(12) United States Patent
Sompalli et al.

(10) Patent No.: US 7,785,435 B2
(45) Date of Patent: Aug. 31, 2010

(54) METHOD OF LAMINATING A DECAL TO A CARRIER FILM

(75) Inventors: Bhaskar Sompalli, Rochester, NY (US); Chunxin Ji, Pennfield, NY (US); Susan G. Yan, Fairport, NY (US); Hubert A. Gasteiger, Rochester, NY (US); Hiroshi Shimoda, Tokyo (JP)

(73) Assignees: GM Global Technology Operations, Inc., Detroit, MI (US); Asahi Glass Co., Ltd., Yokohama-Shi (JP)

( * ) Notice: Subject to any disclaimer, the term of this patent is extended or adjusted under 35 U.S.C. 154(b) by 563 days.

(21) Appl. No.: 11/475,381

(22) Filed: Jun. 27, 2006

(65) Prior Publication Data

US 2007/0199649 A1 Aug. 30, 2007

Related U.S. Application Data

(60) Provisional application No. 60/777,197, filed on Feb. 27, 2006.

(51) Int. Cl.
*B44C 1/175* (2006.01)
*B29C 65/48* (2006.01)
*B32B 37/06* (2006.01)
*B32B 37/14* (2006.01)
*B32B 38/10* (2006.01)
*B29C 65/56* (2006.01)
*B32B 37/22* (2006.01)

(52) U.S. Cl. .................. 156/237; 156/230; 156/247; 156/289

(58) Field of Classification Search .......... 156/230, 156/247, 249, 289, 237
See application file for complete search history.

(56) References Cited

U.S. PATENT DOCUMENTS

| 4,235,657 | A  | * | 11/1980 | Greenman et al. | 156/234 |
| 6,036,809 | A  | * | 3/2000  | Kelly et al.    | 156/247 |
| 6,524,736 | B1 |   | 2/2003  | Sompalli et al. |         |
| 6,712,923 | B2 | * | 3/2004  | Tanaka          | 156/230 |
| 7,022,638 | B2 | * | 4/2006  | Kaji et al.     | 502/101 |
| 7,090,738 | B2 | * | 8/2006  | Kanaoka et al.  | 156/182 |
| 7,316,794 | B2 | * | 1/2008  | O'Brien         | 264/104 |

(Continued)

FOREIGN PATENT DOCUMENTS

CA 2618192 2/2007

(Continued)

OTHER PUBLICATIONS

Translation of German Office Action for Application No. 10 2007 009 001.5 in the name of GM Global Technology Operations, Inc., pp. 1-3.

(Continued)

*Primary Examiner*—Philip C Tucker
*Assistant Examiner*—Sonya Mazumdar
(74) *Attorney, Agent, or Firm*—Reising Ethington P.C.

(57) ABSTRACT

A process comprising: depositing a liquid bonding layer comprising an ionomer and a solvent over a carrier film; placing a decal substrate over the liquid bonding layer and drying the liquid bonding layer to provide a solid bonding layer comprising the ionomer, and the solid bonding layer bonding the decal substrate and carrier film together.

25 Claims, 1 Drawing Sheet

U.S. PATENT DOCUMENTS

| | | | |
|---|---|---|---|
| 7,357,691 B2 * | 4/2008 | Liu et al. ........................ | 445/50 |
| 2002/0144394 A1 * | 10/2002 | Uchida et al. .............. | 29/623.5 |
| 2004/0036394 A1 * | 2/2004 | Hamrock et al. .............. | 313/30 |

FOREIGN PATENT DOCUMENTS

| | | |
|---|---|---|
| DE | 101 51 458 | 5/2002 |
| DE | 10 2004 059 695 | 6/2006 |
| DE | 10 2005 038 612 | 2/2007 |
| DE | 102005038612 A1 * | 2/2007 |

OTHER PUBLICATIONS

Gerd Habenicht, Kleben, Dec. 5, 1997, pp. 172-177.

* cited by examiner

METHOD OF LAMINATING A DECAL TO A CARRIER FILM

CROSS-REFERENCE TO RELATED APPLICATIONS

This application claims the benefit of U.S. Provisional Application No. 60/777,197, filed Feb. 27, 2006.

FIELD

The disclosed embodiments generally relate to methods of laminating a decal substrate to a carrier film.

BACKGROUND

In the fuel cell art, catalysts have been coated onto polymer electrolyte membranes. The catalyst layer may be deposited directly on the membrane, or indirectly applied to the membrane by first coating the catalyst on a decal substrate. The catalysts have been coated on the decal substrate as a slurry using a rolling process. The membrane with the catalyst coated thereon is known as a catalyst coated membrane (CCM).

After the catalyst is coated on the decal substrate, an ionomer may be sprayed over the catalyst before the catalyst is transferred to membrane. Even though both the catalyst and the membrane contain the ionomer, the ionomer spray layer provides a better contact between the catalyst and the membrane. This increases the proton exchange between the membrane and the catalyst, thus increasing the performance of the fuel cell.

The decal substrate may be of porous material, such as a porous expanded polytetrafluoroethylene (ePTFE) decal substrate. However, the ePTFE substrate is expensive and not reusable. Particularly, when the catalyst is transferred to the membrane on the ePTFE substrate, a certain portion of the ionomer remains in the ePTFE substrate. Further, the ePTFE substrate may stretch, deform and absorb solvents during the process, and thus the ePTFE substrates are discarded after one use.

The decal substrate can also be a non-porous material, such as an ethylene tetrafluoroethylene (ETFE) decal substrate. The ETFE decal substrate provides minimal loss of catalyst and ionomer to the substrate because virtually all of the coating and ionomer are transferred in the decal process. The ETFE decal substrates do not deform and may be reused.

In another fabrication technique, the membrane electrode assembly (MEA) is prepared as a catalyst-coated diffusion media (CCDM) instead of a CCM. The diffusion media is porous material so that gas and water may be transported through the MEA. The diffusion media is typically a carbon paper substrate that is coated with a microporous layer, wherein the microporous layer is a mixture of carbon and a fluoropolymer (FEP, PVDF, HFP, PTFE etc.). A catalyst ink is typically coated on top of the microporous layer, and may be overcoated, for example, by spraying with an ionomer solution. A piece of bare perfluorinated membrane is sandwiched between two pieces of CCDM with the catalyst sides facing the membrane and then hot-pressed to bond the CCDM to the membrane.

One approach to manufacturing robust MEAs can be found in commonly assigned U.S. Pat. No. 6,524,736 to Sompalli, et al. This approach includes a process to manufacture MEAs by coating catalyst inks on porous expanded—PTFE supports or webs to generate electrodes with a uniform distribution of the ionomeric binder as shown in FIGS. 1-2a. The concept of over-spraying to aid good transfer of catalyst to the membrane is also described. Sompalli, et al., U.S. Pat. No. 6,524,736, discloses the following. The very thin microporous substrates, onto which the catalyst is deposited, may be difficult to handle, and a porous carrier film may be bonded to the thin microporous substrates to provide a layer of strength and support. The porous carrier film may be sufficiently bonded to the microporous substrate during the process of removing the substrate from the membrane electrode assembly. The bond must be maintained between the microporous substrate and the porous carrier film throughout the entire process, and must be sustained through temperatures of the hot-pressing step.

SUMMARY OF EXEMPLARY EMBODIMENTS OF THE INVENTION

One embodiment of the invention includes a process comprising: depositing a liquid bonding layer comprising an ionomer and a solvent over a carrier film; placing a decal substrate over the liquid bonding layer and drying the liquid bonding layer to provide a solid bonding layer comprising the ionomer, and solid bonding layer bonding the decal substrate and carrier film together.

Other embodiments of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of embodiment(s) is merely exemplary in nature and is in no way intended to limit the invention, its application, or uses.

Figure 1:
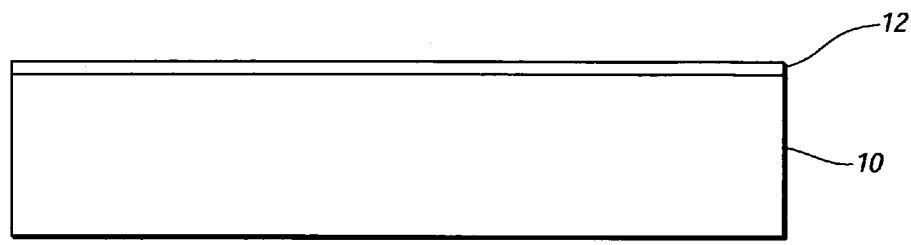
FIG. 1 illustrates one embodiment of the invention including a method of depositing a liquid bonding layer including an ionomer over a carrier film.

Referring now to FIG. 1, one embodiment of the invention includes a method of depositing a liquid bonding layer 12 over a carrier film 10. In one embodiment of the invention the carrier film 10 has a thickness ranging from 25 to 100 micrometers. In one embodiment of the invention, the carrier film may be PET, Polyimide (Kapton®), PEN, PVDF or any polymeric films that can withstand temperatures up to 150° C. The liquid bonding layer 12 includes an ionomer and a solvent. In one embodiment of the invention, the carrier film comprises a porous material. In alternative embodiments of the invention, the liquid bonding layer 12 may be deposited to a thickness ranging from 5-200 microns, 5-100 microns, or thickness therebetween.

Figure 2:
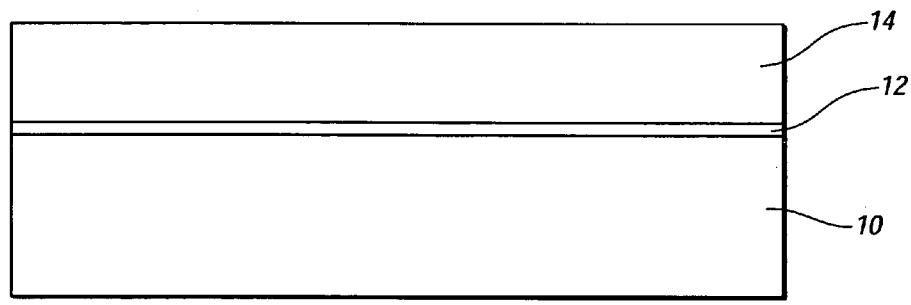
FIG. 2 illustrates one embodiment of the invention including depositing a decal substrate on the liquid bonding layer.

Referring now to FIG. 2, in one embodiment of the invention, before the solvent in the liquid bonding layer 12 evaporates, a decal substrate 14 is placed on the liquid bonding layer 12 under minimal or elevated compression. Thereafter, the solvent in the liquid bonding layer 12 is allowed to evaporate or is driven off using heat, for example from an oven or drying lamps. In one embodiment the liquid bonding layer 12 is dried at a temperature ranging from room temperature to 120° C., and preferable at 60-120° C.

The decal substrate 14 may be any of a variety of materials having a pore size below 2 microns, preferable below 0.5 microns and most preferably below 0.2 microns. The void volume of the porous material may range from 50-80 percent. Preferably the porous material is temperature compatible for approximately 5 minutes at a temperature ranging from 130-150° C. Additional surface coatings may be applied on the decal substrate 14 to aid in the release of a catalyst formed over the decal substrate 14. The decal substrate 14 may be of variety of porous materials including, for example, porous polyethylene or porous polypropylene. The carrier film 10 has a greater mechanical strength and resistance to tearing than the decal substrate 14. In one embodiment of the invention, the decal substrate 14 may be ePTFE and the carrier film 10 may be PET.

Figure 3:
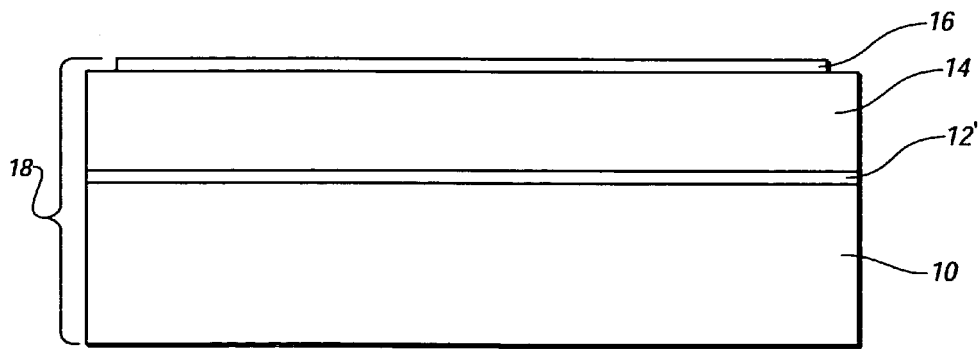
FIG. 3 illustrates one embodiment of the invention including a method of allowing the liquid bonding layer to solidify and depositing a catalyst slurry layer on the decal substrate.

Referring now to FIG. 3, in one embodiment of the invention, after the solvent in the liquid bonding layer 12 has evaporated, a solid bonding layer 12', which includes an ionomer, holds the carrier film 10 and the decal substrate 14 together. In alternative embodiments of the invention, the solid bonding layer 12' may have a thickness ranging from 0.05-10 microns, 0.05-2 microns, 0.1-1 microns, or a thickness therebetween. A catalyst slurry layer 16 is deposited on the decal substrate 14 and is dried to produce a decal assembly 18 which includes the dried catalyst layer 16 attached to the decal substrate 14 bonded to the carrier film 10.

The catalyst layer preferably includes a group of finely divided carbon particles supporting finely divided catalytic particles such as platinum and a proton conductive material intermingled with the particles. The proton conductive material may be an ionomer such as a perfluorinated sulfonic acid polymer. Preferred catalyst materials include metals such as platinum, platinum alloys and other catalyst known to those in the fuel cell art.

The liquid bonding layer 12 includes an ionomer and a solvent. The solvent may be water, a low boiling alcohol or mixtures thereof. For example, the alcohol has a boiling point below 120° C. and has a finite drying time. Examples of low boiling alcohols are methanol, ethanol, iso and n-propanol. Bonding the decal substrate 14 and the carrier film 10 together using a liquid bonding layer 12 that includes an ionomer eliminates the need to laminating the decal substrate 14 and carrier film 10 under high temperature which can damage porous decal substrates such as ePTFE.

When the terms "over", "overlying", "overlies", or "under", "underlying", "underlies" are used with respect to the relative position of a first component or layer with respect to a second component or layer, such shall mean that the first component or layer is in direct contact with the second component or layer, or that additional layers or components may be interposed between the first component or layer and the second component or layer.

The description of the invention is merely exemplary in nature and, thus, variations thereof not to be regarded as a departure from the spirit and scope of the invention.

What is claimed is:

1. A process comprising:
   depositing a liquid bonding layer comprising an ionomer and a solvent over a carrier film with the proviso that the liquid bonding layer does not include a catalyst;
   placing a decal substrate over the liquid bonding layer and drying the liquid bonding layer to provide a solid bonding layer comprising the ionomer, and the solid bonding layer bonding the decal substrate and carrier film together, and depositing a catalyst layer over the decal substrate.

2. A process as set forth in claim 1 wherein the decal substrate comprises a porous material.

3. A process as set forth in claim 1 wherein the decal substrate is porous and comprises one of polytetrafluoroethylene, polyethylene or polypropylene.

4. A process as set forth in claim 1 wherein the decal substrate comprises expanded polytetrafluoroethylene.

5. A process as set forth in claim 1 wherein the decal substrate comprises a porous material having a pore size ranging from 10-200 microns.

6. A process as set forth in claim 1 wherein the carrier film comprises a non-porous material.

7. A process as set forth in claim 1 wherein the carrier film comprises a porous material.

8. A process as set forth in claim 1 wherein the carrier film has a greater mechanical strength than the decal substrate.

9. A process as set forth in claim 1 wherein the carrier film comprises PET.

10. A process as set forth in claim 1 wherein the carrier film comprises a polyimide.

11. A process as set forth in claim 1 wherein the ionomer comprises a sulfonated perfluorocarbon.

12. A process as set forth in claim 1 wherein the solvent comprises water.

13. A process as set forth in claim 1 wherein the solvent comprises a low boiling alcohol.

14. A process as set forth in claim 1 wherein the solvent comprises water and a low boiling alcohol.

15. A process as set forth in claim 1 wherein the liquid bonding layer on the carrier film is deposited to a thickness ranging from 5-200 microns.

16. A process as set forth in claim 1 wherein the liquid bonding layer on the carrier film is deposited to a thickness ranging from 5-100 microns.

17. A process as set forth in claim 1 wherein the solid bonding layer has a thickness ranging from 0.05-10 microns.

18. A process as set forth in claim 1 wherein the solid bonding layer has a thickness ranging from 0.05-2 microns.

19. A process as set forth in claim 1 wherein the solid bonding layer has a thickness ranging from 0.1-1 microns.

20. A process as set forth in claim 1 wherein the drying of the liquid bonding layer is conducted at a temperature ranging from room temperature to 200° C.

21. A process as set forth in claim 1 wherein the drying of the liquid bonding layer is conducted at a temperature ranging from 60-120° C.

22. A process comprising:
    depositing a liquid bonding layer consisting essentially of an ionomer and a solvent over a carrier film;
    placing a decal substrate over the liquid bonding layer and drying the liquid bonding layer to provide a solid bonding layer comprising the ionomer, and the solid bonding layer bonding the decal substrate and carrier film together.

23. A process as set forth in claim 22 wherein the decal substrate is porous and comprises one of polytetrafluoroethylene, polyethylene or polypropylene.

24. A process as set forth in claim 22 wherein the decal substrate comprises expanded polytetrafluoroethylene.

25. A process as set forth in claim 24 further comprising depositing a catalyst layer over the decal substrate.

* * * * *